United States Patent
Schulte et al.

(10) Patent No.: US 7,002,694 B2
(45) Date of Patent: Feb. 21, 2006

(54) INTERFEROMETER SYSTEM AND METHOD FOR RECORDING AN INTERFEROGRAM USING WEIGHTED AVERAGING OVER MULTIPLE FREQUENCIES, AND METHOD FOR PROVIDING AND MANUFACTURING AN OBJECT HAVING A TARGET SURFACE

(75) Inventors: Stefan Schulte, Aalen (DE); Bernd Dörband, Aalen (DE); Henriette Müller, Aalen (DE); Wolfgang Kähler, Aalen (DE)

(73) Assignee: Carl Zeiss SMT AG, Oberkochen (DE)

( * ) Notice: Subject to any disclaimer, the term of this patent is extended or adjusted under 35 U.S.C. 154(b) by 23 days.

(21) Appl. No.: 10/743,792

(22) Filed: Dec. 24, 2003

(65) Prior Publication Data

US 2004/0190002 A1 Sep. 30, 2004

Related U.S. Application Data

(63) Continuation of application No. PCT/EP02/07080, filed on Jun. 26, 2002.

(30) Foreign Application Priority Data

Jun. 27, 2001 (DE) ................................ 101 30 902

(51) Int. Cl.
*G01B 9/02* (2006.01)
(52) U.S. Cl. ..................................................... 356/512
(58) Field of Classification Search ................ 356/512, 356/513, 514, 515, 615
See application file for complete search history.

(56) References Cited

U.S. PATENT DOCUMENTS

| 3,694,088 A | 9/1972 | Gallagher et al. |
| 4,159,522 A | 6/1979 | Zanoni |
| 4,169,980 A | 10/1979 | Zanoni |
| 4,225,240 A | 9/1980 | Balasubramanian |
| 4,340,306 A | 7/1982 | Balasubramanian |

(Continued)

FOREIGN PATENT DOCUMENTS

DE 4119744 A1 12/1992

OTHER PUBLICATIONS

Timothy Day, et al., "Continuously Tunable Diode Lasers", Lasers & Optronics, pp. 15-17, Jun. 1993.

(Continued)

*Primary Examiner*—Samuel A. Turner
(74) *Attorney, Agent, or Firm*—Jones Day

(57) ABSTRACT

An interferometer system comprises a reference surface, a support for an object providing an object surface, a radiation source for emitting radiation of an adjustable frequency onto the reference surface and the object surface, a position-sensitive radiation detector, a controller for adjusting a plurality of different frequencies of the radiation emitted by the radiation source, and an integrator for averaging the interference patterns superposed on the radiation detector at different frequencies. Moreover, there is provided a method for recording an interferogram, a method for providing an object with a target surface as well as a method for manufacturing an object with a target surface.

14 Claims, 5 Drawing Sheets

U.S. PATENT DOCUMENTS

| | | | |
|---|---|---|---|
| 4,594,003 | A | 6/1986 | Sommargren |
| 4,652,744 | A | 3/1987 | Bowers et al. |
| 4,682,025 | A | 7/1987 | Livingston et al. |
| 4,732,483 | A | 3/1988 | Biegen |
| 4,909,629 | A | 3/1990 | Yokokura et al. |
| 5,135,308 | A | 8/1992 | Kuchel et al. |
| 5,135,309 | A | 8/1992 | Kuchel et al. |
| 5,343,294 | A | 8/1994 | Kuchel et al. |
| 5,357,341 | A | 10/1994 | Küchel et al. |
| 5,390,023 | A | 2/1995 | Biegen |
| 5,398,113 | A | 3/1995 | de Groot |
| 5,414,552 | A | 5/1995 | Godil |
| 5,452,088 | A | 9/1995 | Ai |
| 5,473,434 | A | 12/1995 | de Groot |
| 5,488,477 | A | 1/1996 | de Groot |
| 5,493,394 | A | 2/1996 | de Groot et al. |
| 5,561,525 | A | 10/1996 | Toyonaga et al. |
| 5,598,265 | A | 1/1997 | de Groot |
| 5,600,441 | A | 2/1997 | de Groot et al. |
| 5,649,849 | A | 7/1997 | Pileri et al. |
| 5,671,050 | A | 9/1997 | de Groot et al. |
| 5,777,741 | A | 7/1998 | Deck |
| 5,838,485 | A | 11/1998 | de Groot et al. |
| 5,909,282 | A | 6/1999 | Kulawiec |
| 5,948,468 | A | 9/1999 | Sweatt et al. |
| 5,953,125 | A | 9/1999 | de Groot |
| 6,043,886 | A | 3/2000 | Bruning |
| 6,163,379 | A | 12/2000 | de Groot |
| 6,359,692 | B1 * | 3/2002 | Groot .......................... 356/512 |

OTHER PUBLICATIONS

Ahmed Abou-Zeid, et al, "Abstimmbare und frequenzstabilisierte 633-nm-Diodenlaser für die interferometrische Längenmeβtechnik", Technisches Messen 65, pp. 147-153, 1998, R. Oldenbourg Verlag, Germany (with English-language Abstract).

Katherine Creath, "4 Temporal Phase Measurement Methods", Interferogram Analysis, Digital Fringe Pattern Measurement Techniques, ed. by D.W. Robinson et al., pp. 94-140, 1993, Institutes of Physics Publishing, Bristol and Philadelphia.

Peter J. de Groot, "Wavelength-tuned phase shifting interferometry applied to the measurement of transparent plates", Optical Society of America, pp. 85-87, 1999.

Tim Day, et al, "Widely Tunable External Cavity Diode Lasers", New Focus, Inc., 7 pages.

Robert A. Jones, et al., "An Automated Interferogram Analysis Technique", Applied Optics, vol. 7, No. 8, pp. 1477-1482, Aug. 1968.

J.H. Bruning, et al., "Digital Wavefront Measuring Interferometer for Testing Optical Surfaces and Lenses", Applied Optics, vol. 13, No. 11, pp. 2693-2703, Nov. 1974.

Moshe Schaham, "Precision optical wavefront measurement", SPIE vol. 306 Contemporary Methods of Optical Fabrication, pp. 183-191, 1981, The International Society for Optical Engineering.

Hong Zhang Hu, "Polarization heterodyne interferometry using a simple rotating analyzer. 1: Theory and error analysis", Applied Optics, vol. 22, No. 13, pp. 2052-2056, Jul. 1983.

B. Shine, "Tunable Diode Lasers Stand up to Research and Commercial Applications," originally published in Photonics Spectra, Jan. 1999, p. 102.

B. Shine et al., "Tunable Diode Lasers," originally published in Lasers & Optronics, Mar. 1998, pp. 13-14.

Peter J. de Groot, "Measurement of Transparent Plates with Wavelength-Tuned Phase-Shifting Interferometry," Applied Optics, vol. 39, No. 16, Jun. 2000, pp. 2658-2663, Optical Society Of America.

* cited by examiner

INTERFEROMETER SYSTEM AND METHOD FOR RECORDING AN INTERFEROGRAM USING WEIGHTED AVERAGING OVER MULTIPLE FREQUENCIES, AND METHOD FOR PROVIDING AND MANUFACTURING AN OBJECT HAVING A TARGET SURFACE

This application is a continuation of International Application No. PCT/EP02/07080 filed on Jun. 26, 2002, which International Application was published by the International Bureau on Jan. 9, 2003, and which was not published in English, the entire contents of which are incorporated herein by reference. This application also claims the benefit of DE 101 30 902.3 filed on Jun. 27, 2001, the entire contents of which are incorporated herein by reference.

BACKGROUND OF THE INVENTION

1. Field of the Invention

The present invention relates to an interferometer system and a method for recording an interferogram. The interferometer system and the method are preferably used to determine topological properties of an object surface from the interferogram by evaluating the recorded interferogram.

Furthermore, the invention relates to a method for providing and manufacturing an object having a target surface, wherein deviations between the target surface and an actual surface of the object are determined from an interferogram and wherein the object is provided or reworked dependent upon such deviations.

2. Brief Description of Related Art

Usually, interferometer systems are used, among others, to determine topological properties of an object surface. To this end, for example, a known reference surface and an object surface to be measured are illuminated with coherent radiation, and an object wave field reflected from the object surface and a reference wave field reflected from the reference surface are superimposed on e.g. a screen such that an interference pattern is generated thereon. From the interference pattern a difference between the optical paths from the reference surface to the screen and from the object surface to the screen may be determined position-dependently. From such differences topological differences between the object surface and the reference surface may then be determined.

Two techniques are commonly applied to determine such path differences with an interferometer system:

A first approach is the so-called fringe pattern interferometery "FPI", wherein an optical path difference between two wavefronts is determined from positions of fringe centers of an interference pattern. In this respect, reference can be made, for example, to R. A. Jones and P. L. Kadakia, "An Automated Interferogram Technique", Applied Optics, vol. 7, pp. 1477–1482 (1968); Zanoni, U.S. Pat. No. 4,159, 522, published Jun. 26, 1979 and Zanoni, U.S. Pat. No. 4,169,980, published Oct. 2, 1979.

Another approach is the so-called phase measuring interferometry "PMI", wherein the phase difference between the two wavefronts is calculated for each pixel of a detector from a plurality of interference patterns, said plurality of interference patterns being recorded in that different phase differences are generated therein. In this respect, reference can be made, for example, to J. H. Brunning et al., "Digital Wavefront Measuring Interferometer for Testing Optical Surfaces and Lenses", Applied Optics, vol. 13, pp. 2693–2703 (1974); Gallagher et al., U.S. Pat. No. 3,694,088, published Sep. 26, 1972, N. Balasubramanian, U.S. Pat. No. 4,225,240, published Sep. 30, 1980; M. Schaham, Proceedings SPIE, vol. 306, pp. 183–191 (1981); and H. Z. Hu, "Polarization heterodyne interferometry using a simple rotating analyzer. 1: Theory and error analysis", Applied Optics, vol. 22, pp. 2052–2056 (1983).

From U.S. Pat. No. 4,594,003 there is known an interferometer system in which the frequency of the radiation source is variable so that the fringes of the interference pattern can be displaced without an optical component of the interferometer system, such as a reference surface or an object surface, having to be mechanically shifted. In said system, it is provided for a change over such a range that the fringes of the interference pattern are displaceable over a full fringe width. Four interference patterns are recorded, namely with four different frequencies of the radiation source distributed within said range. For each pixel of the detector a phase $\phi$ of the optical path difference is then calculated according to the following formula:

$$\varphi(x, y) = \arctan\left(\frac{B(0) - B(2)}{B(1) - B(3)}\right),$$

wherein $B(0)$ to $B(3)$ are the intensities of the individual images at the respective pixel.

This known method for determining path differences is less suitable if there is a further surface present in the interferometer system which likewise reflects a wave field which interferes with the wave fields reflected by the reference surface and the object surface. The resulting interference pattern is then of a particular complex nature. This situation occurs, for example, if a surface of a transparent plate with two substantially plane-parallel surfaces is to be measured.

SUMMARY OF THE INVENTION

It is an object of the present invention to provide an interferometer system and a method for recording an interferogram which is less sensitive to disturbing reflections.

Moreover, it is an object of the invention to provide a method for providing and manufacturing an object with a target surface.

In this respect, the invention proceeds from an interferometer system comprising a reference surface, an object surface, a radiation source for illuminating the reference surface and the object surface with radiation of an adjustable frequency and a position-sensitive radiation detector. The radiation source, the reference surface, the object surface and the detector are disposed such that a reference wave field reflected from the reference surface is superimposed with an object wave field reflected from the object surface to form an interference pattern with a position-dependent intensity distribution, said interference pattern being imaged onto the detector. Here, the interference pattern formed by superposition of the reference wave field and the object wave field is disturbed by a disturbing wave field which is likewise superimposed on said wave fields, said disturbing wave field being reflected from a disturbing interference surface which is illuminated by the radiation source together with the reference surface and the object surface, respectively.

The invention is distinguished in this respect by an integrator for position-dependent averaging of a plurality of interference patterns which are recorded at different frequencies of the radiation emitted by the radiation source.

The resulting interferogram is thus generated such that for each position of the interferogram an average is formed from the intensities of the individual interference patterns at said position. Herein, the averaging is preferably a weighted averaging.

The weighting factors for the weighted averaging or/and the values of the different radiation frequencies are preferably set as a function of the distance of the disturbing interference surface from the object surface and the reference surface, respectively. Preferably, these values are set such that an influence of the disturbing wavefront on the interferogram is substantially averaged out. The interferogram formed by averaging a plurality of interference patterns is then of such a configuration and intensity distribution, respectively, which corresponds approximately to that which would be generated by the wavefronts reflected from the object surface and the reference surface alone as if the disturbing interference surface were not present in the interferometer system.

In this respect, it is further advantageous for the optical path difference between the reference surface and the object surface to be adjustable, since by appropriately selecting these distances relative to each other, an influence of the disturbing wavefront on the interferogram can be further reduced.

It is advantageous for the plurality of frequencies for producing the plurality of interference patterns to be adjusted successively in time over a period of time which corresponds to an exposure time interval of a camera which records the interference patterns. This enables a particular simple design of the integrator since it is then formed by the camera itself.

BRIEF DESCRIPTION OF THE DRAWINGS

Exemplary embodiments of the invention will be illustrated with reference to drawings below, wherein.

DETAILED DESCRIPTION OF EXEMPLARY EMBODIMENTS

Figure 1:
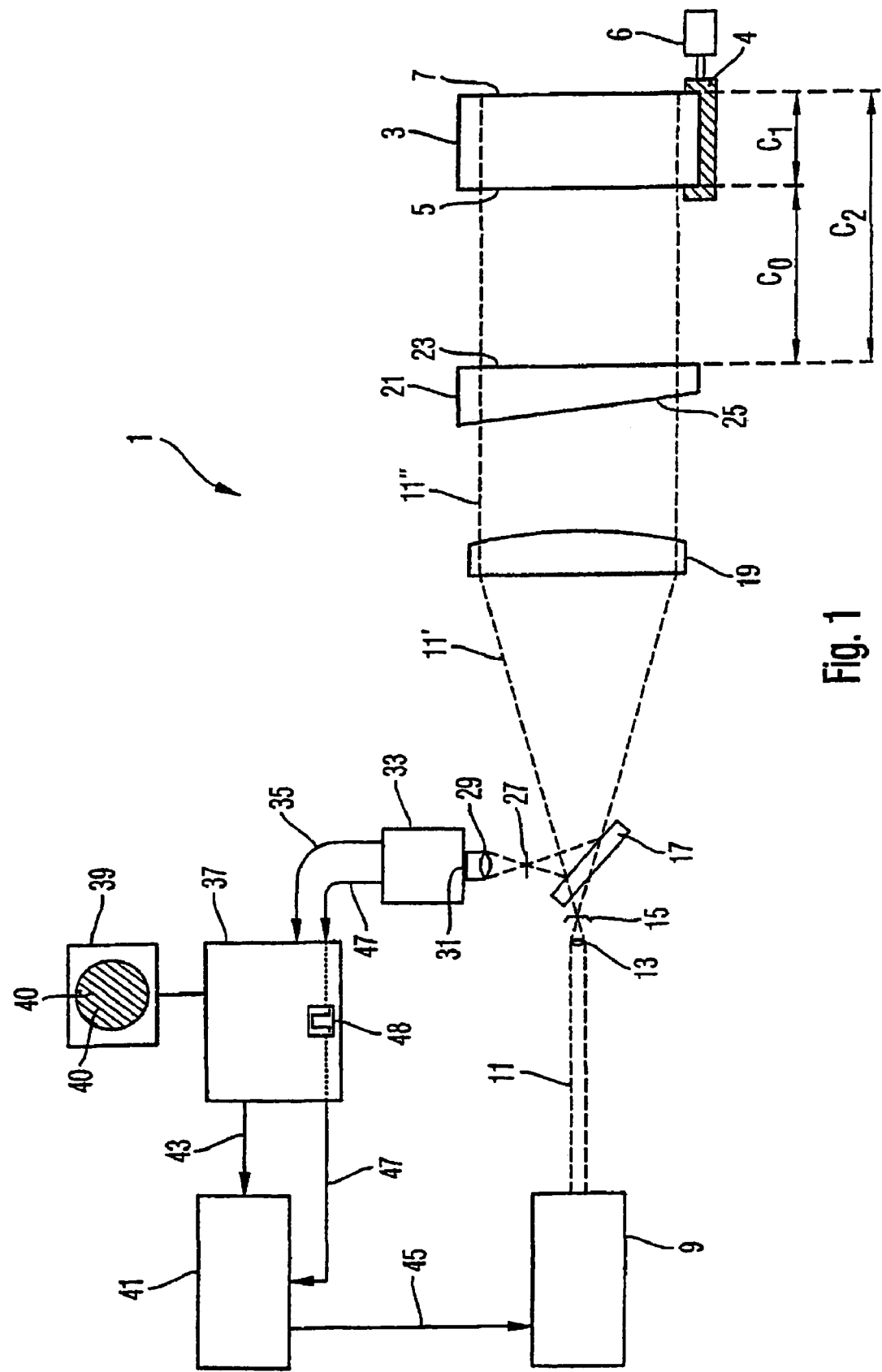
FIG. 1 is an embodiment of an interferometer system according to the invention.

FIG. 1 shows a Fizeau interferometer system 1 for measuring a surface 5 of a plane-parallel plate 3. The plate 3 is fixed in a support 4 which is displaceable relative to a reference surface 23 by means of a motor drive 6.

The interferometer system 1 comprises a light source 9 which emits a beam 11 of coherent light with adjustable wavelength and frequency, respectively. The light source 9 is a so-called ECDL source, i.e., a diode laser with adjustable external cavity (external cavity diode laser).

Such an ECDL radiation source is, for example, described in the article "Widely Tunable External Cavity Diode Lasers" by Tim Day, Michael Brownell and I-Fan Wu. Corresponding sources can be obtained from the company New Focus, Inc., 1275 Reamwood Avenue, Sunnyvale, Calif. 94089, USA.

The beam 11 emitted by the source 9 is focused by a lens 13 onto a rotating ground glass plate or diffusing plate 15 for suppressing spatial coherence of the radiation. The diffusing plate 15 rotates about an axis of rotation not shown in FIG. 1.

After having passed through the focus in the region of the diffusing plate 15, the expanding beam 11' traverses a semi-transparent mirror 17 and, after having been sufficiently expanded, is then rendered parallel by a collimator 19 which may comprise one or more lenses. The thus parallelized beam 11" passes through a glass plate 21 whose surface 23 facing away from the collimator 19 forms the reference surface for measuring the surface 5 of the plane-parallel plate 3. The reference surface 23 is provided as flat as possible. A surface 25 of the plate 21 facing towards the collimator 19 extends at an angle with respect to the reference surface 23 so that radiation reflected from said surface 25 is not reflected back upon itself and does not contribute to disturbing interferences.

Radiation reflected back upon itself from reference surface. 23 is again collimated by the collimator 19, impinges on the semi-transparent mirror 17 and is imaged by the mirror, after having passed through an aperture 27 and an ocular 29, onto a radiation-sensitive layer 31 of a CCD camera 33. A part of the beam 11 passing through the reference surface 23 impinges on the surface 5 of the plane-parallel plate 3 to be measured. The surface 5 to be measured is oriented as orthogonally as possible in respect of the direction of the parallel beam 11". A portion of the radiation impinging on the surface 5 to be measured is, again, reflected back upon itself, passes again through the plate 21 and is likewise focused by the collimator 19 and imaged on the radiation-sensitive surface 31. The radiation-sensitive layer 31 of the camera 33 thus forms a screen on which the radiation reflected back from the reference surface 23 interferes with the radiation reflected from the surface 5 to be measured.

It is one purpose of the interferometer arrangement 1 to detect the interference pattern generated by the interfering superposition of the radiation reflected back from the reference surface 23 and the radiation reflected back from the surface 5 to be measured.

As already mentioned above, the plate 3 is, however, a plane-parallel plate, that is, the surface 5 of the plate 3 to be measured and a back surface 7 of the plate 3 opposed thereto extend substantially parallel to each other. This results in that a portion of the radiation 11 passing through the surface 5 to be measured is likewise reflected back upon itself from the back surface 7 of the plate 3 and imaged on the radiation-sensitive layer 31.

Accordingly, on the one hand, the radiation reflected back from the reference surface 13 interferes on the radiation-sensitive layer 31 with the radiation reflected back from the surface 5 to be measured, an optical path length difference therebetween being $2 \cdot C_0$, and, on the other hand, the radiation reflected from the reference surface 23 interferes on the radiation-sensitive layer 31 with the radiation reflected from the back surface 7 of the plane-parallel plate 3, an optical path length difference therebetween being $2 \cdot C_2$, and, furthermore, the radiation reflected from the surface 5 of the plate 3 to be measured interferes there with the radiation reflected from the back surface 7 thereof, an optical path length difference therebetween being $2 \cdot C_1$. The interference pattern generated on the radiation-sensitive layer 31 is thus very complicated and difficult to evaluate.

The camera 33 supplies the data which are representative of a radiation intensity distribution on the radiation-sensitive surface 31 via a data line 35 to a computer 37.

The computer 37, in turn, generates a representation of the interference pattern on the radiation-sensitive layer 31 on a display 39, an interference pattern being represented merely schematically in FIG. 1 by a plurality of fringes 40. Further, the computer 37 stores the data and also performs an evaluation of the interference pattern to determine therefrom level differences between the reference surface 23 and the surface 5, to be measured, and the topology of the surface 5 to be measured, respectively.

Moreover, the interferometer system 1 comprises a controller 41 which is supplied, via a control line 43, with frequency data and which is triggered by the computer 37, said controller then setting, time-dependently, via a line 45 the frequency of the radiation 11 to be emitted from the source 9 in response to a trigger signal 48 generated by the camera 33 which is also supplied to the computer via a line 47.

A method for operating the interferometer system 1 is described hereinbelow, the plate 3 being assumed to have a thickness of 74 mm, so that, taking the refractive index of the glass of the plate 3 into consideration, a resulting optical path difference $2 \cdot C_1$ of 214.39 mm is provided.

First, the controller 41 sets, via line 45, the frequency of the radiation source 9 to a first frequency with a value $f-\Delta f$ and starts, via line 47, the integration of the CCD camera 33 so that the interference pattern which is generated by the wavefronts reflected from the three surfaces 23, 5 and 7, upon illumination with radiation of the frequency $f-\Delta f$, impinges on the radiation-sensitive surface 31 of the camera 33, and the corresponding radiation intensity is integrated there. After 3.75 msec, the controller 41 sets the source 9 to a second, higher frequency f so that interference patterns generated at this frequency impinge during the integration time of the camera 33 as second interference patterns on the radiation-sensitive layer 31, and the corresponding radiation intensities are integrated there with the intensities of the first interference pattern. After a further 7.5 msec, the controller 41 sets the frequency of the radiation source 9 to a still higher, third frequency with the value $f+\Delta f$ so that the interference pattern generated at this third frequency likewise impinges during the integration time of the camera on the light-collecting surface 31 thereof, and the intensities of the third interference pattern are added to the intensities of the first and the second interference patterns. The illumination with the third frequency $f+\Delta f$ lasts for 3.75 sec. After that, the controller 41 causes, via line 47, the integration time of the camera 33 to terminate, and the data which represent position-dependently the entire light intensity which has impinged during the integration time on the light-collecting surface 31 are read-out and supplied to the computer 37 via line 35.

The above-described integration time of the camera of 15 msec was chosen in the present embodiment to achieve a high-quality image at the given laser power.

Depending on the laser energy available and other boundary conditions, it is also possible to set different integration times.

These data are thus representative of the sum of three different inference patterns, wherein the first interference pattern was recorded with radiation of the frequency $f-\Delta f$, wherein the second interference pattern was recorded with the frequency f and wherein the third interference pattern was recorded with the frequency $f+\Delta f$. When the three interference patterns are integrated, the interference pattern recorded at the medium frequency f is weighted with double the weighting factor as compared to the two other frequencies $f-\Delta f$, $f+\Delta f$.

Figure 2:
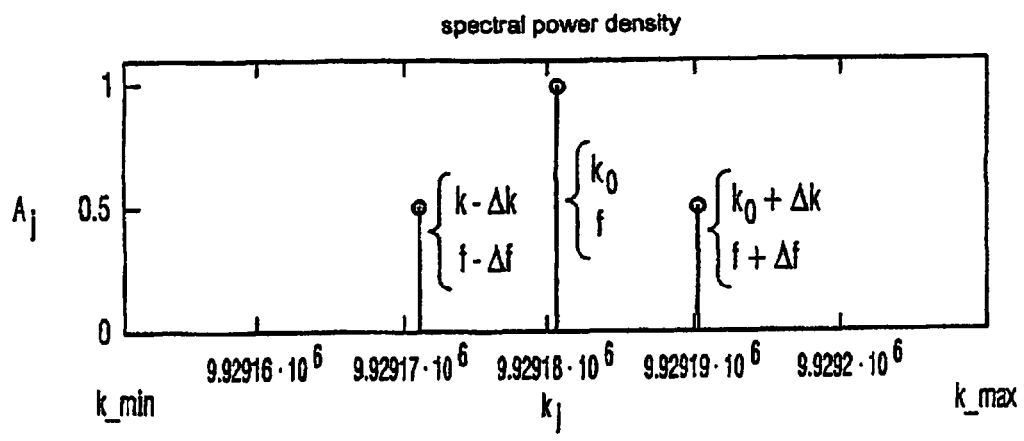
FIG. 2 is a diagram illustrating differing frequencies of radiation emitted by a radiation source of FIG. 1 for generating interference patterns.
Figure 3:
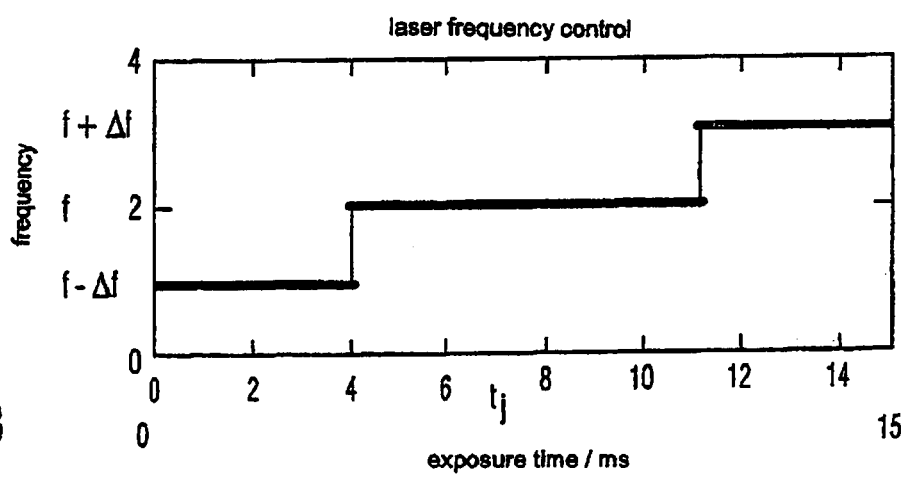
FIG. 3 shows a time dependency of the radiation emitted from the radiation source of FIG. 1.

This weighted illumination with three different frequencies is again illustrated in FIGS. 2 and 3. In FIG. 2, the spectral power density is shown in arbitrary units as a function of the wave number k of the radiation of the source 9. It is apparent that the illumination with the three different frequencies is effected with the relative weighting factors 0.5, 1 and 0.5. This spectral power density distribution can be represented as a formula as follows:

$$F(k) = A \cdot \left[ \frac{1}{2} \delta(k-(k_0-\Delta k)) + \delta(k-k_0) + \frac{1}{2} \delta(k-(k_0+\Delta k)) \right] \quad \text{Equation (1)}$$

wherein $\delta$ is Dirac's delta function k is the wave number $2\pi/\lambda$, $k_0$ is the basic wave number $2\pi/\lambda_0$ and $\Delta k$ is the wave number change corresponding to the frequency change $\Delta f$.

In the present case, $\lambda_0$ was chosen to be 632.8 nm. The radiation source 9 can be set to this wavelength, and this setting is advantageous in so far as, apart from the radiation source, a structure and components which are known from interferometers operated with conventional He—Ne lasers can be used for the interferometer system.

The interferogram as Fourier transform of the spectral density may be written as $$\begin{aligned} I(x) &= \int_0^\infty F(k) \cdot \cos kx \cdot dx \\ &= A \cdot \frac{1}{2} \{ \cos(k_0-\Delta k) \cdot x + \cos(k_0+\Delta k) \cdot x \} + A \cdot \cos(k_0 x) \\ &= A \cdot \cos k_0 x \cdot (1 + \cos \Delta k x) \end{aligned} \quad \text{Equation (2)}$$

Figure 4:
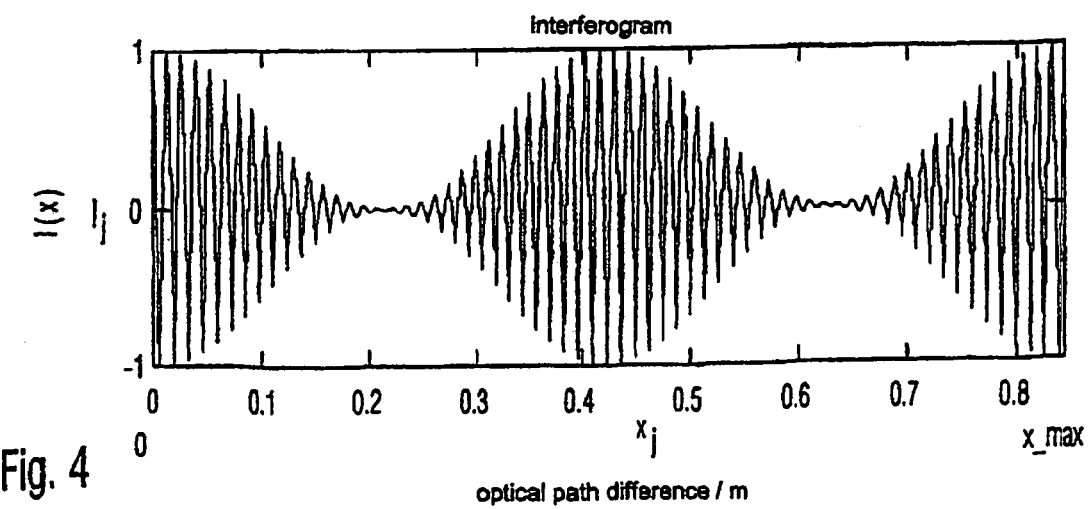
FIG. 4 is a diagram showing an interferogram intensity as a function of an optical path difference for an interference pattern generated by the interferometer system of FIG. 1 when the frequencies are set in accordance with FIGS. 2 and 3.

Accordingly, a beat wave number of $\Delta k$ results for the interferogram. A graph of the function I(x) is schematically shown in FIG. 4 for an arbitrary point in the interferogram. An envelope of the depicted curves is also referred to as interference contrast or modulation. Accordingly, the modulation periodically increases and decreases as a function of the distance from the reference surface, wherein the modulation goes down to zero at specific distances.

An advantageous operation of the interferometer system 1 is provided when the reflecting surfaces 23, 5, 7 are disposed relative to one another such that the optical path difference $2 \cdot C_1$ caused by the distance between the surface 5 to be measured and the back surface 7 approximately coincides with the first minimum of the modulation minimum, and such the path difference $2 \cdot C_2$ caused by the distance between the reference surface 23 and the back surface 7 of the plate 3 approximately coincides with the second minimum of the modulation minimum, and such that the path length difference $C_0$ produced by the distance between the reference surface 23 and the surface 5 to be measured approximately coincides with the second maximum of the modulation maximum. To this end, first of all the frequency change $\Delta f$ and wave number change $\Delta k$, respectively, are determined as follows:

First, $1+\cos \Delta k \cdot C_1$ is set to 0, which results in $\Delta k \cdot C_1 = \pi$. As, in the present example, the plate thickness $C_1$ is assumed to be 214.139 mm, this results in $\Delta k = 14.67 \text{m}^{-1}$. Then, the distance of the plate 3 from the reference surface 23 is adjusted via the drive 6 such that $\Delta k \cdot C_2 = 3\pi$ is fulfilled. It should be noted in this respect that the last-mentioned condition need to be observed only with relative little accuracy, since the modulation according to FIG. 4 exhibits quadratic minima and these are thus relatively insensitive to changes in the optical path difference.

With the above-illustrated setting of $\Delta k$ and the distance of the back surface 7 from the reference surface 23, the optical path length difference $2 \cdot C_0$ is automatically set to such a value that it approximately coincides: with the second maximum of the modulation maximum according to FIG. 4.

Accordingly, the disturbing interferences caused by the back surface 7 of the plate 3 are thus effectively averaged out by the weighted averaging carried out during the integration time of the camera 33, so that the interferogram obtained by the averaging comprises, apart from a constant radiation portion, merely a fringe pattern as it would be generated by the interference solely of the wavefront reflected back from the reference surface 23 with the wavefront reflected back from the surface 5 to be measured. This relatively simple and undisturbed interference pattern is then subjected to a conventional evaluation method for fringe patterns in order to determine on the basis thereof the topology of the surface 5 to be measured.

The operation of the interferometer system 1 is not limited to control the frequency of the radiation source 9 with the timing scheme shown in FIG. 3. In the following, there is discussed as a variant the possibility to change the frequency of the radiation source 9 with a sinusoidal time dependency. First, be it assumed here for the interferogram intensity I:

$$I(x) = I_0 \cdot [1 + V \cdot \cos(k \cdot x - \Phi_0)], \quad \text{Equation (3)}$$

wherein
k is the wave number of the radiation which can be assumed to be approximately constant in this formula,
x is the optical wavelength difference,
$\Phi_0$ is an interferogram phase and
V is an interference contrast.

Due to the sinusoidal frequency change, the interferogram phase then results into $$\Phi_0 = \Phi_0(t) = \Phi_0' + A \cdot \sin \omega t, \quad \text{Equation (4)}$$

wherein
$\Phi_0'$ is an average phase value,
$\omega$ is the angular velocity of the phase modulation and
A is a phase modulation amplitude.

Inserted into equation (3), it thus follows:

$$I(x,t) = I_0 \cdot [1 + V \cdot \cos(k \cdot x - \Phi_0' - A \cdot \sin \omega t)]. \quad \text{Equation (5)}$$

Figure 5:
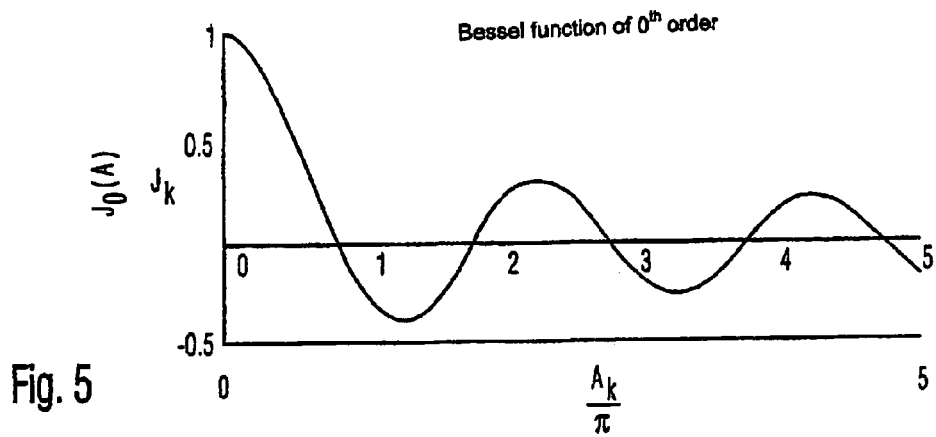
FIG. 5 shows an interferogram modulation as a function of an optical path difference in the interferometer system of FIG. 1 which results from another time-dependent setting of the frequencies of the radiation source.

The modulation period for the frequency change of the radiation is then set such that an integer numbered multiplicity thereof corresponds to the integration time of the camera 33. The time averaged interferogram is thus calculated to be $$\bar{I}(x) = \quad \text{Equation (6)}$$

$$\frac{1}{2\pi} \int_{-\pi}^{\pi} I_0 \cdot [1 + V \cdot \cos(k \cdot x - \Phi_0' - A \cdot \sin \omega t)] \cdot d(\omega t) =$$

$$I_0 + I_0 \cdot V \cdot \cos(k \cdot x - \Phi_0') \cdot \underbrace{\frac{1}{2\pi} \int_{-\pi}^{\pi} \cos(A \cdot \sin \omega t) \cdot d(\omega t)}_{J_0(A)} +$$

$$I_0 \cdot V \cdot \sin(k \cdot x - \Phi_0') \cdot \underbrace{\frac{1}{2\pi} \int_{-\pi}^{\pi} \sin(A \cdot \sin \omega t) \cdot d(\omega t)}_{0}$$

$$\bar{I}(x) = I_0 \cdot [1 + V \cdot \cos(k \cdot x - \Phi_0') \cdot J_0(A)]$$

wherein $J_0(A)$ is the Bessel function of Zero order of the phase modulation amplitude A. This function is shown in FIG. 5.

Phase modulation amplitudes A may then be determined such that interferences between the wavefronts reflected back from the surface 5 to be measured and from the back surface 7 of the plate 3 will disappear. Accordingly, the frequency modulation amplitude of the radiation source 9 must be set such that the phase modulation for the optical wavelength difference $2 \cdot C_1$ corresponds to the first Zero point of the Bessel function of Equation (6). This is the case for $A_1 = 0.76547 \cdot \pi$.

Furthermore, by changing the distance between the reference surface 23 and the plate 3, it is achieved that the optical wavelength difference $2 \cdot C_2$ corresponds to the second minimum of the Bessel function of Equation (6), which is the case for $A_2 = 1.7571 \cdot \pi$. The ratio of the optical path differences is thus given by the two first Zero point of the Bessel function $J_0(A)$ $$\frac{C_2}{C_1} = \frac{A_2}{A_1} = 2.2955 \quad \text{Equation (7)}$$

On the other hand, $C_0 = C_2 - C_1$ is valid, and for the optical path difference $C_0$ to be measured, the amplitude results in $$A_0 = \frac{C_0}{C_1} \cdot A_1 = \frac{C_2 - C_1}{C_1} \cdot A_1 = 0.9916 \cdot \pi \quad \text{Equation (8)}$$

At this point, the Bessel function $J_0(A)$ has the value $$J_0(A_0) = -0.297 \approx -0.3 \quad \text{Equation (9)}.$$

In this arrangement, three partial beams having an approximately identical basic intensity interfere with each other. However, only the fringe patterns of two interfering partial beams are visible in the weighted averaged, respectively integrated interferogram. The other interferences are averaged out, form a constant radiation portion which reduces the contrast, however. The effective contrast is calculated to be $$V_{eff} = V \cdot J_0(A_0) = \frac{2}{3} \cdot |-0.3| = 0.2 \qquad \text{Equation (10)}$$

This contrast is sufficient to determine the positions of the fringes 40 and to be able to derive the topology of the surface 5 to be measured from the evaluation of the fringe pattern. However, it should be noted that the radiation frequency setting according to the scheme shown in FIG. 3 results in a higher effective contrast.

Figure 6:
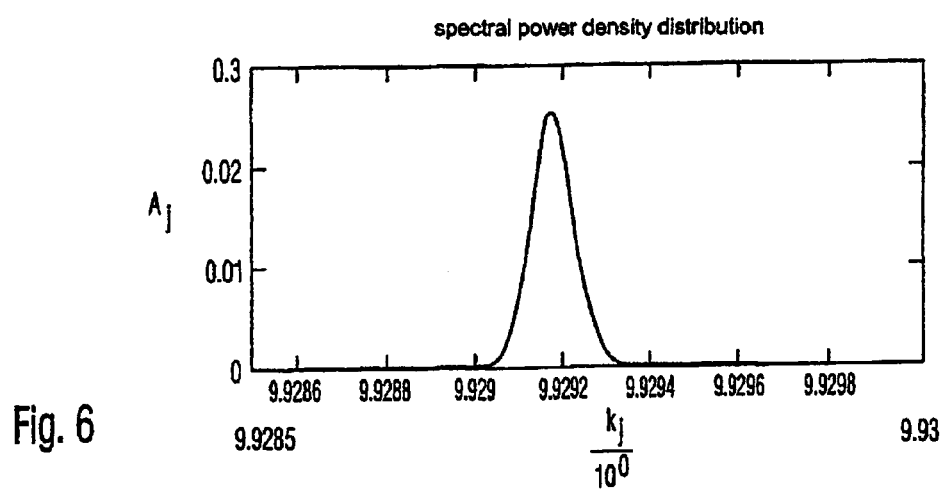
FIG. 6 shows a frequency distribution corresponding to FIG. 2 of the radiation emitted from the radiation source.

In the following, there is described as further exemplary embodiment for a situation such that the radiation source 9 is controlled to emit a Gaussian spectral power density as shown in FIG. 6

$$A(k) = \sqrt{\frac{\pi}{2}} \cdot \sigma \cdot e^{-\frac{(k-k_0)^2 \cdot \sigma^2}{2}}, \qquad \text{Equation (11)}$$

wherein k is the wave number $2\pi/\lambda$ $k_0$ is the central wave number $2\pi/\lambda_0$ $\sigma$ is the width of the Gaussian function.

For this spectral distribution a time-dependent control function for the radiation frequency is now to be determined. In this respect, the dependency $$\frac{dk(t)}{dt} = \frac{1}{A[k(t)]} \qquad \text{Equation (12)}$$

is to be observed. This equation may be solved numerically by the computer 37 in order to finally obtain a time scheme corresponding to FIG. 3 for the controlling of the radiation frequency.

Figure 7:
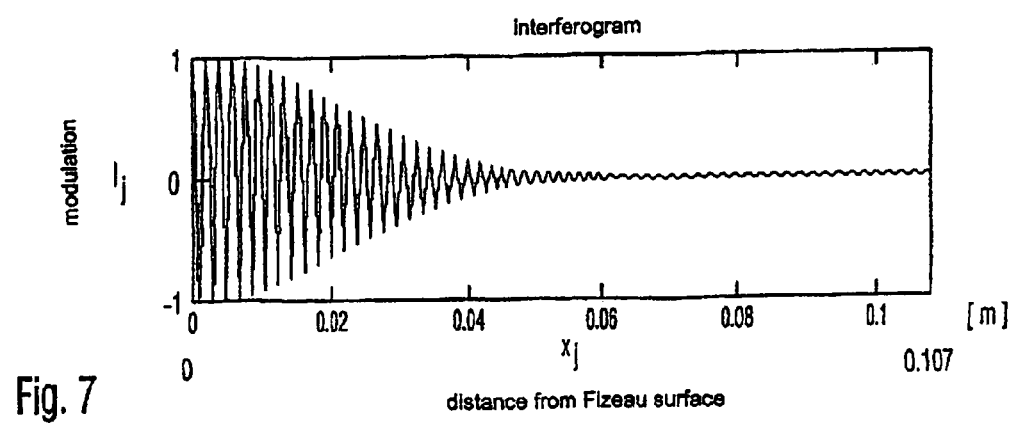
FIG. 7 is a representation corresponding to FIG. 4 of the interferogram intensity as a function of the optical path length difference when using the frequency distribution shown in FIG. 6.

With the spectral power density according to FIG. 6, a dependency of the interferogram intensity on the path difference results as it is shown in FIG. 7. It is evident therefrom that, at small distances from the reference surface 23, high interference contrasts are achievable, whereas the contrast is strongly reduced at larger distances from the reference surface 23. This reduction in contrast is so strong that, when the plate 3 is positioned closely adjacent to the reference surface 23, interferences which are caused by the back surface 7 are largely averaged out, and merely interferences caused by the surface 5 to be measured contribute to the fringe pattern of the averaged interferogram.

This corresponds to an interferogram with a radiation having a frequency which is constant in time and to a reduced coherence length which is shorter than the optical thickness $C_1$ of the plate 3. The time-dependent frequency change of a radiation source having a large coherence length thus has an effect which corresponds to a reduction of the time coherence for specific lengths. With reference to FIG. 4, this means that the time-dependent frequency change has caused the coherence of the radiation to be destroyed in the regions of the minima of the modulation minima.

Further variants of the embodiments illustrated with reference to FIGS. 1 to 7 will be described hereinbelow. Components which correspond in their structure and function to those of FIGS. 1 to 7 are designated by the same reference numbers, but, for the purpose of distinction, are supplemented by an additional letter. For the purpose of illustration, reference is made in each case to the entire foregoing description.

Figure 8:
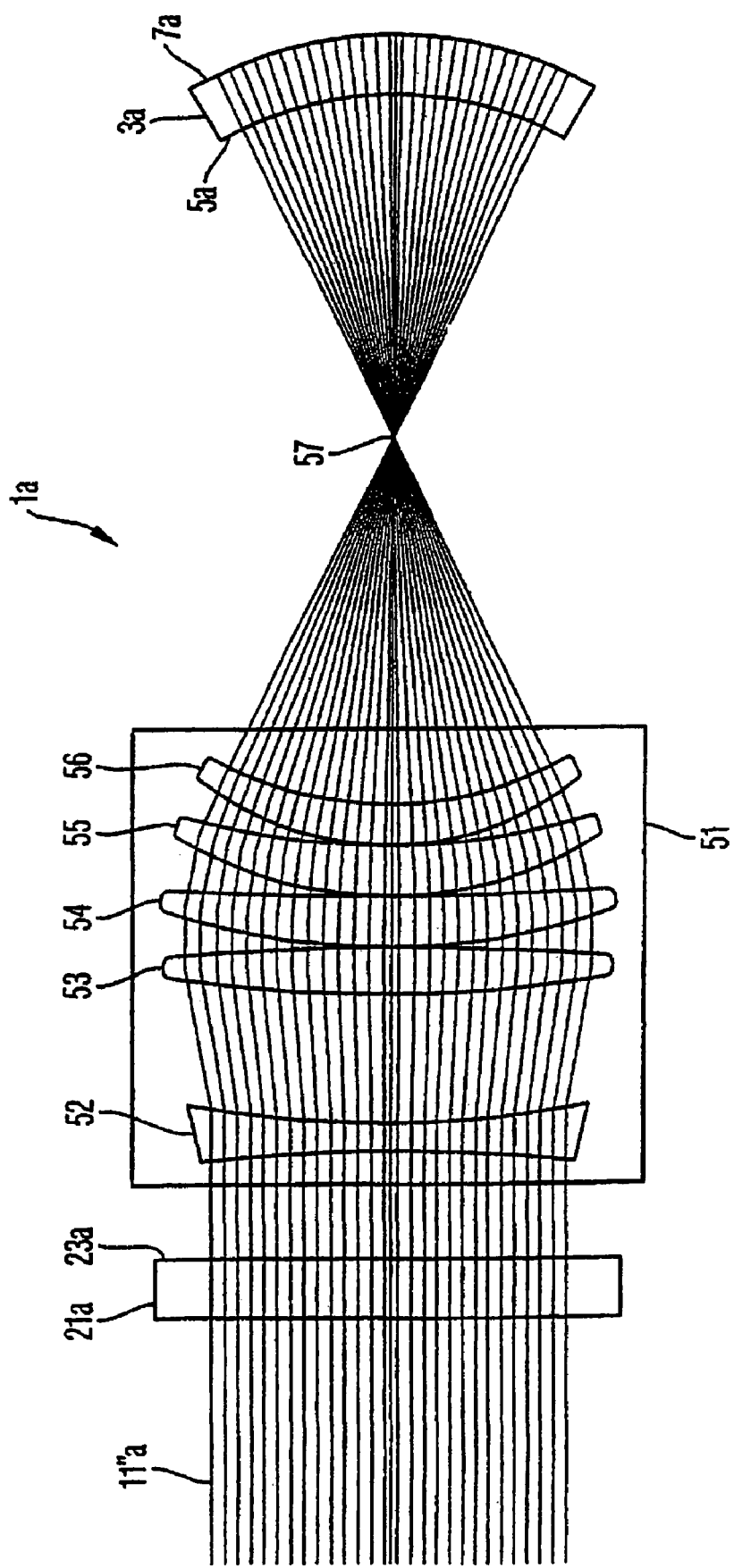
FIG. 8 is a partial view of a further embodiment of the interferometer system according to the invention.

FIG. 8 shows a partial view of an interferometer system 1a which is similar in construction to the interferometer system shown in FIG. 1. However, the interferometer system 1a serves to measure a concentric meniscus lens 3a rather than a plane-parallel plate. An aplanar collimator 51 having a plurality of lenses 52 to 56 is positioned in the beam path downstream of a reference plate 21a having a reference surface 23a, said collimator focussing the parallel radiation 11"a in a location 57 which further is a center of curvatures of the surfaces 5a and 7a of the concentric meniscus lens 3a.

Otherwise, the interferometer system 1a corresponds to the interferometer system shown in FIG. 1 and is operated according to a method as illustrated with reference to the interferometer system of FIG. 1. That is, the frequency of the radiation source is controlled in a time-dependent manner such that disturbing interferences are largely averaged out in terms of time which disturbing interferences may be caused by a surface of the concentric meniscus lens 3a which is currently not measured, in particular the surface 7a, or by other optically effective components in the beam path.

The surfaces 5a and 7a of the meniscus lens 3a can also be measured by positioning the lens reversely, that is, it is positioned in the beam path with its convex surface 7a disposed towards the collimator 51 and upstream of the focus 57.

Figure 9:
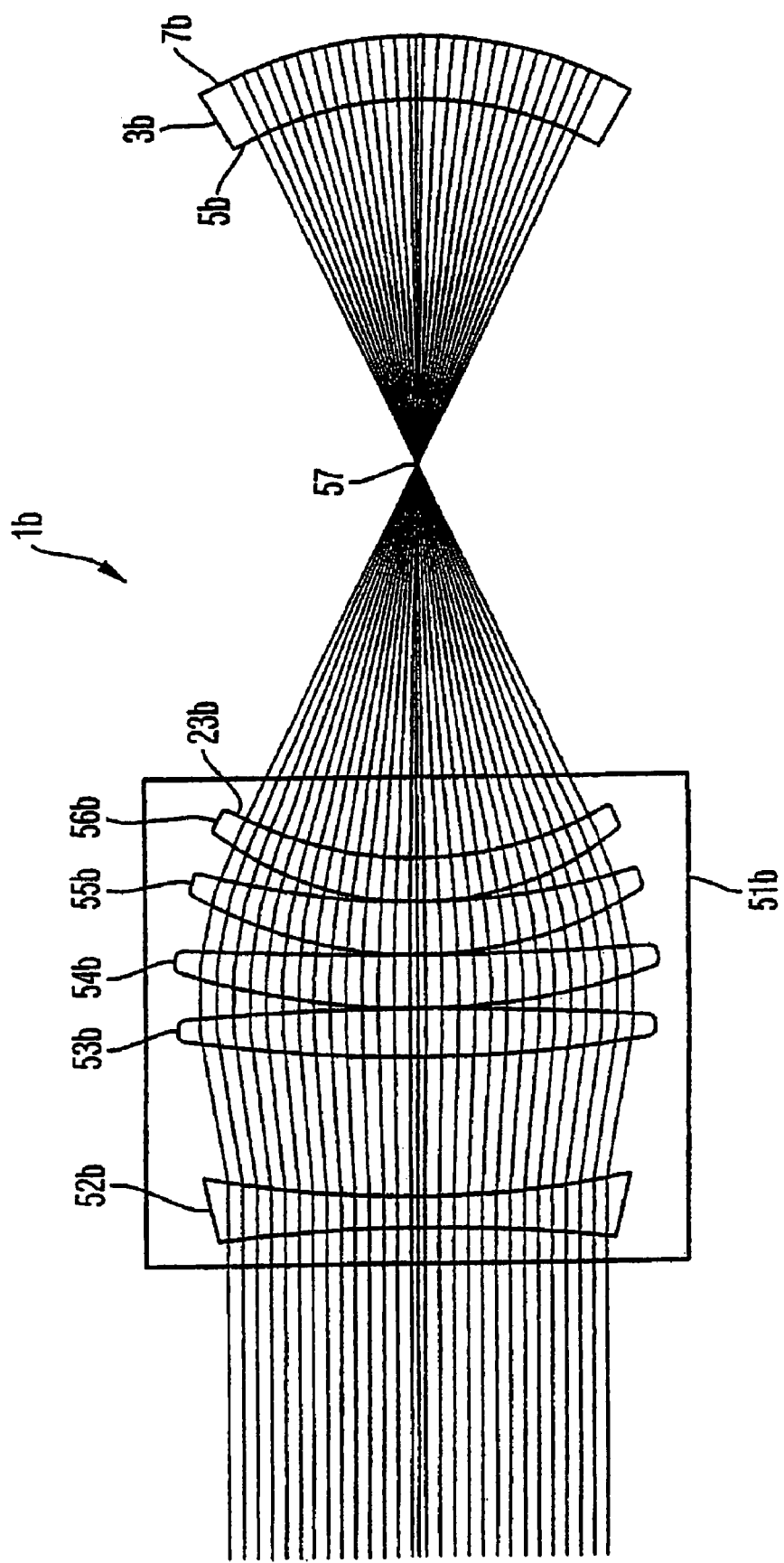
FIG. 9 is a partial view of a further embodiment of the interferometer system according to the invention.

FIG. 9 shows a variant of the interferometer system shown in FIG. 8. In contrast to that system, in the interferometer system 1b according to FIG. 9 a reference surface 23a is not provided on a separate reference plate but on a precisely fabricated surface of the lens 56b of an aplanar collimator 51, which surface is disposed towards the object to be measured. The interferometer system 1b, too, serves to measure a concentric meniscus lens.

Apart from the above-described time-dependencies of the frequency of the radiation source for generating the interferogram, it is also possible to select other time-dependencies which are found to be favorable. What is decisive in this respect is that interference effects which are caused by surfaces which are not to be measured are at least partially averaged out over time.

The interferometer system was described above as a Fizeau interferometer. However, it is also possible to use alternative interferometer types, such as a Michelson interferometer configuration or a Twyman Green interferometer configuration.

In the above-described exemplary embodiments, the CCD camera was used as integrator for the weighted averaging of the interference patterns generated at different illumination frequencies. However, it is also possible to use other camera types which have an integration time which is adapted to the sequence of the illumination frequencies adjusted successively in time. Furthermore, it is possible to generate separate camera images for several radiation frequencies, to supply the same to the computer and to carry out the integration and weighted averaging, respectively, pixel-by-pixel in the computer. The term pixel should be understood within the scope of the present application to mean a resolution unit of the digitalized interference image which is determined, among others, by the camera system. Here, the averaging effected in the computer can also be carried out for groups of pixels, that is, with a resolution which is lower than the camera resolution.

The above-described interferometer system and the method for recording the interferogram is advantageously used in a method for providing an object and in a method for manufacturing an object with a predetermined target surface.

If, for example, the plane-parallel plate described with reference to FIG. 1 is to be manufactured with high precision, it is positioned in the beam path of the interferometer system, and an interferogram is recorded according to the above-described method. Deviations of the surface 5 from the flat nominal shape are determined from the interferogram. On the basis of these deviations, a machining operation is planned. In particular, positions on the surface 5 are determined from these deviations where a machining operation, in particular, by further removal of material, is to be effected. After the reworking operation has been carried out, another interferogram is taken, if required, and further reworking operations are effected, if required. If the recorded interferogram shows that deviations between the shape of the surface 5 and the plane nominal shape are less than a predefined value, the plate is provided and shipped.

This providing and manufacturing method can be applied to any other object which is to have a predetermined surface. The application to a concentric meniscus lens has already been described above. However, other applications for any other objects are conceivable as well.

The present invention has been described by way of exemplary embodiments to which it is not limited. Variations and modifications will occur to those skilled in the art without departing from the scope of the present invention as given by the appended claims and equivalents thereof.

What is claimed is:

1. An interferometer system, comprising:
a radiation source for emitting radiation of an adjustable frequency;
a reference surface;
a support for an object providing an object surface;
a position-sensitive radiation detector;
a disturbing interference surface;
a controller; and
an integrator;
wherein the radiation source, the reference surface, the support and the radiation detector are positioned such that a first portion of the radiation emitted by the radiation source is incident on the reference surface and reflected as a reference wave field therefrom, a second portion of the radiation emitted by the radiation source is directed towards the object surface to generate an object wave field reflected from the object surface, and the reference wave field and the object wave field are superposed to form an interference pattern having a position-dependent intensity distribution on the radiation detector;
wherein the disturbing interference surface is positioned such that radiation emitted from the radiation source is incident thereon and that a disturbing wave field reflected from the disturbing interference surface contributes to the position-dependent intensity distribution on the radiation detector;
wherein the controller is configured for setting the adjustable frequency of the radiation emitted by the radiation source to a plurality of different frequencies; and
wherein the integrator is controlled to perform position-dependent averaging over the different frequencies of the interference patterns formed on the radiation detector to thereby generate an interferogram.

2. The interferometer system according to claim 1, wherein the radiation detector is comprises a CCD camera.

3. The interferometer system according to claim 1, wherein the integrator is formed by the radiation detector.

4. The interferometer system according to claim 3, wherein the controller is configured to set the adjustable frequencies to at least two different frequencies during a period of time which corresponds to an integration time of the detector.

5. The interferometer system according to claim 3, wherein the controller is configured to set the adjustable frequencies to all of the plurality of different frequencies during a period of time which corresponds to an integration time of the detector.

6. A method for recording an interferogram, comprising:
illuminating a reference surface and an object surface with coherent radiation having a frequency;
superposing a reference wave field reflected from the reference surface and an object wave field reflected from the object surface such that an interference pattern with a position-dependent radiation intensity distribution is formed on a radiation receiving surface; and
changing the frequency of the radiation successively to a plurality of different radiation frequencies, such that a plurality of interference patterns is successively formed on the radiation receiving surface in accordance with the respective different radiation frequencies;
wherein the interferogram is generated by a weighted averaging over the different radiation frequencies of intensities of the plurality of interference patterns at respective positions of the interferogram.

7. A method of manufacturing an object having an object surface of a target shape, the method comprising:
illuminating a reference surface and the object surface with coherent radiation having a frequency;
superposing a reference wave field reflected from the reference surface and an object wave field reflected from the object surface such that an interference pattern with a position-dependent radiation intensity distribution is formed on a radiation receiving surface;
changing the frequency of the radiation successively to a plurality of different radiation frequencies, such that a plurality of interference patterns is successively formed on the radiation receiving surface in accordance with the respective different radiation frequencies;
generating an interferogram by a weighted averaging over the different radiation frequencies of intensities of the plurality of interference patterns at respective positions of the interferogram; and
machining the object surface in dependence of the generated interferogram.

8. The method according to claim 7, wherein weighting factors for the weighted averaging are set by adjusting durations of illumination with the respective different radiation frequencies.

9. The method according to claim 7, wherein a disturbing interference surface is disposed at a distance from at least one of the object surface and the reference surface, wherein the disturbing interference surface is illuminated with the coherent radiation, and wherein values of at least one of the different radiation frequencies and of weighting factors for the weighted averaging are determined in dependence of the distance.

10. The method according to claim 7, wherein a first optical path difference exists between an optical path from the reference surface to the radiation receiving surface and an optical path from the object surface to the radiation receiving surface;

wherein a second optical path difference exists between an optical path from the reference surface to the radiation receiving surface and an optical path from the disturbing interference surface to the radiation receiving surface;

wherein a difference exists between the first optical path difference and the second optical path difference;

wherein the illumination is performed with a lower frequency, a medium frequency, and a higher frequency of the coherent radiation, wherein a frequency difference between the higher frequency and the medium frequency is equal to a frequency difference between the medium frequency and the lower frequency such that the equation $$\Delta k \cdot C_1 = \pi$$

is fulfilled, wherein $\Delta k$ is a wave number change corresponding to the frequency difference, $C_1$ is the difference between the first optical path difference and the second optical path difference;

wherein the distance between the disturbing interference surface and the radiation receiving surface is adjusted such that the equation $$\Delta k \cdot C_2 = \pi$$

is fulfilled, wherein $C_2$ is the second optical path difference; and wherein the weighted averaging is performed such that a same weighting factor is associated with the interference patterns corresponding to the lower and higher frequencies and that a weighting factor associated with the interference pattern corresponding to the medium frequency is twice the weighting factor associated with the interference pattern corresponding to the lower frequency.

11. The method according to claim 7, further comprising determining differences between the object surface and the target surface in dependence of the generated interferogram, wherein the machining is performed in dependence of the determined differences.

12. The method of claim 11, wherein the machining comprises removing surface portions from the object at positions which are determined as a function of the differences between the object surface and the target surface.

13. The method according to claim 6, wherein the radiation receiving surface comprises a radiation sensitive surface of a radiation detector.

14. The method according to claim 7, wherein the radiation receiving surface comprises a radiation sensitive surface of a radiation detector.

* * * * *